J. F. BUCHMIER.
HARROW.
APPLICATION FILED APR. 17, 1917.
1,260,318.
Patented Mar. 26, 1918.
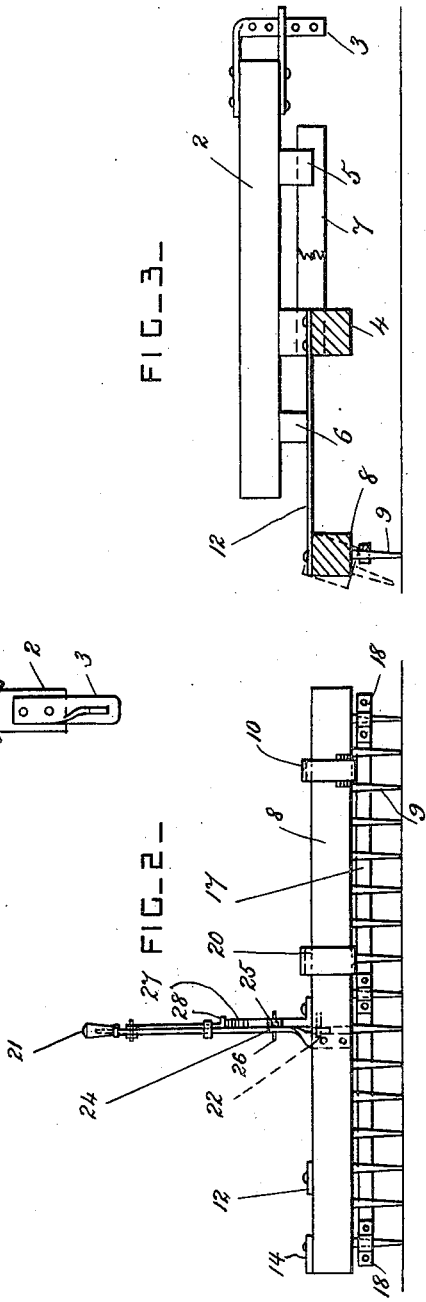
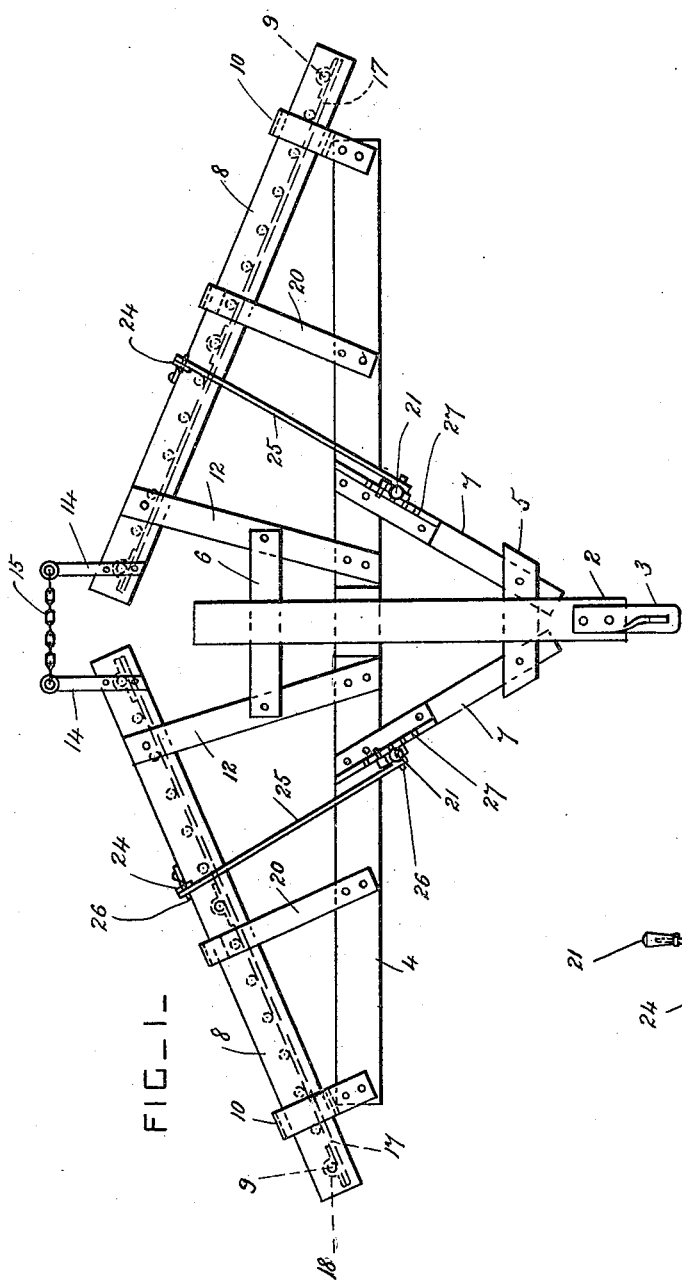
Inventor
John F. Buchmier
by Herbert W. J. Jenner
Attorney.

UNITED STATES PATENT OFFICE.

JOHN F. BUCHMIER, OF MONEE, ILLINOIS.

HARROW.

1,260,318.                Specification of Letters Patent.        Patented Mar. 26, 1918.

Application filed April 17, 1917. Serial No. 162,611.

*To all whom it may concern:*

Be it known that I, JOHN F. BUCHMIER, a citizen of the United States, residing at Monee, in the county of Will and State of Illinois, have invented certain new and useful Improvements in Harrows, and I do hereby declare the following to be a full, clear, and exact description of the invention, such as will enable others skilled in the art to which it appertains to make and use the same.

This invention relates to toothed harrows especially adapted for attachment at the rear of ordinary disk harrows for the purpose of more thoroughly pulverizing the clods and surface soil and leveling the ground after it has been worked by the disks of the disk harrow; and it consists in the novel construction and combination of the parts hereinafter fully described and claimed.

In the drawings, Figure 1 is a plan view of a toothed harrow constructed according to this invention. Fig. 2 is a rear end view of one of the toothed bars, showing also the lever for adjusting it. Fig. 3 is a side view of the draft pole, showing also portions of the harrow frame and one toothed bar in cross-section.

The harrow is provided with a draft pole 2 arranged longitudinally at its middle part, and this pole has any suitable draft attachments 3 at its front end. A main crossbar 4 is provided, and is secured crosswise under the middle part of the draft pole. Two short crosspieces 5 and 6 are provided, and are secured under the draft pole and arranged to the front and to the rear of the main crossbar. Inclined or diagonally arranged bars 7 are provided, and have their rear end portions secured to the main crossbar, and their front end portions secured to the front crosspiece 5.

Two toothed bars 8 are provided, and have downwardly projecting harrow teeth 9 for engaging with the ground. The two toothed bars are arranged at an angle to each other behind the main crossbar, with their rear ends at the middle part of the machine, and with their front or foremost end portions projecting a little beyond the ends of the main crossbar. These foremost end portions are pivotally supported in loop-shaped brackets 10 which are rigidly secured to the end portions of the main crossbar. The toothed bars engage loosely with the brackets so that they can be tilted or moved pivotally in them to place the harrow teeth at an angle to the vertical, as indicated by the dotted lines in Fig. 3.

The adjacent end portions of the toothed bars 8 are supported from the main crossbar 2 and the rear crosspiece 6 by spring arms 12. The adjacent end portions of the toothed bars have rearwardly projecting arms 14 secured to them, and the free end portions of these arms are coupled together loosely by a chain 15, so as to permit the toothed bars to be adjusted independently of each other.

The depth of engagement of the teeth 9 with the ground is regulated by means of adjustable guard plate 17 secured to the toothed bars by clips 18.

The middle parts of the toothed bars 8 are also connected with the main crossbar 2 by means of spring arms 20 which assist in supporting the toothed bars.

Each toothed bar is adjusted or tilted by means of similar lever mechanism. A hand lever 21 is pivoted to one of the diagonal frame bars 7 by a pin 22, and an arm 24 is secured to the middle part of the toothed bar, in rear of the lever 21, and this arm projects upwardly. A connecting rod 25 is pivoted to the lever 21 and to the arm 24 by pins 26, and the position of the hand lever is determined by any suitable locking mechanism.

In the example shown, a toothed quadrant 27 is secured to the bar 7, and the lever 21 is provided with a catch 28 for engaging with the notches of the quadrant.

When the hand levers are moved forwardly the teeth of the toothed bars are tilted to inclined positions, the spring supporting arms being provided so as to permit of this movement, and so as to normally hold the harrow teeth in a vertical position.

What I claim is:

1. In a harrow, a frame provided with a main crossbar, two toothed bars arranged at an angle to each other behind the main crossbar, means for supporting the toothed bars from the main crossbar and permitting them to be tilted independently of each other, and lever mechanism for tilting the said toothed bars at will.

2. In a harrow, a frame provided with a main crossbar, two toothed bars arranged at an angle to each other behind the main crossbar, brackets secured to the main crossbar and pivotally supporting the outer and foremost end portions of the toothed bars, spring arms secured to the main crossbar and supporting the adjacent and rear end portions of the toothed bars, and lever mechanism for tilting the said toothed bars independently of each other at will.

In testimony whereof I have affixed my signature.

JOHN F. BUCHMIER.

Copies of this patent may be obtained for five cents each, by addressing the "Commissioner of Patents, Washington, D. C."